(12) United States Patent
Coenegrachts (10) Patent No.: US 8,712,130 B2
(45) Date of Patent: Apr. 29, 2014

(54) METHOD AND DEVICE FOR EVALUATING EVOLUTION OF TUMOURAL LESIONS

(75) Inventor: Kenneth Louis Stefan Coenegrachts, St. Andries (BE)

(73) Assignee: BVBA dr. K. Coenegrachts, St. Andries (BE)

( * ) Notice: Subject to any disclaimer, the term of this patent is extended or adjusted under 35 U.S.C. 154(b) by 0 days.

(21) Appl. No.: 13/807,739

(22) PCT Filed: Jul. 5, 2011

(86) PCT No.: PCT/EP2011/061315
§ 371 (c)(1),
(2), (4) Date: Dec. 30, 2012

(87) PCT Pub. No.: WO2012/007319
PCT Pub. Date: Jan. 19, 2012

(65) Prior Publication Data
US 2013/0094743 A1   Apr. 18, 2013

(30) Foreign Application Priority Data

Jul. 16, 2010 (EP) .................................. 10007371

(51) Int. Cl.
G06K 9/00 (2006.01)
(52) U.S. Cl.
USPC ............ 382/128; 382/131; 382/132; 382/164
(58) Field of Classification Search
USPC ....................................................... 382/128
See application file for complete search history.

(56) References Cited

U.S. PATENT DOCUMENTS

| 6,754,374 | B1* | 6/2004 | Miller et al. | 382/128 |
| 7,231,074 | B2* | 6/2007 | Raunig | 382/128 |
| 7,548,649 | B2* | 6/2009 | Cardenas et al. | 382/173 |
| 7,616,799 | B2* | 11/2009 | Ramamurthy et al. | 382/131 |
| 7,747,050 | B2* | 6/2010 | Lau et al. | 382/128 |
| 7,840,050 | B2* | 11/2010 | Ramamurthy et al. | 382/131 |
| 8,097,864 | B2* | 1/2012 | Tearney et al. | 250/459.1 |

(Continued)

FOREIGN PATENT DOCUMENTS

WO     2008081365 A2    7/2008

OTHER PUBLICATIONS

Lee, Sang Ho et al "Texture Analysis of Lesion Perfusion Volumes in Dynamic Contrast-Enhanced Breast MRI" SB 2008, pp. 1545-1548.*

(Continued)

*Primary Examiner* — Gandhi Thirugnanam
(74) *Attorney, Agent, or Firm* — Symbus Law Group LLC; Clifford D. Hyra (57) ABSTRACT

A new method (100) for evaluating evolution of tumoral lesions includes: —providing (101) a first image of the tumoral lesions, the first image being made at a first time instant; —providing (102) a second image of the tumoral lesions, the second image being made at a second time instant that is later than the first time instant; —delineating (103) a border of the tumoral lesions in the first image and the second image; —registration (103) of the tumoral lesions in the first image the second image; —segmenting (104) the tumoral lesions in the first image and the second image into concentric areas; —quantifying (105) changes of at least one functional parameter between the concentric areas in the first image and respective corresponding concentric areas in the second image; and —visualizing (106) the changes in a two-dimensional or three-dimensional model of the tumoral lesions.

9 Claims, 9 Drawing Sheets

(56) References Cited

U.S. PATENT DOCUMENTS

| | | | | |
|---|---|---|---|---|
| 8,160,314 | B2* | 4/2012 | Ramamurthy et al. | 382/128 |
| 8,265,359 | B2* | 9/2012 | Andrushkiw et al. | 382/128 |
| 2003/0211036 | A1* | 11/2003 | Degani et al. | 424/1.11 |
| 2004/0013292 | A1* | 1/2004 | Raunig | 382/128 |
| 2005/0065421 | A1* | 3/2005 | Burckhardt | 600/407 |
| 2006/0030768 | A1* | 2/2006 | Ramamurthy et al. | 600/407 |
| 2006/0269111 | A1* | 11/2006 | Stoecker et al. | 382/128 |
| 2008/0008369 | A1* | 1/2008 | Koptenko et al. | 382/128 |
| 2009/0003666 | A1* | 1/2009 | Wu | 382/128 |
| 2011/0181614 | A1* | 7/2011 | Chang et al. | 345/595 |
| 2012/0008838 | A1* | 1/2012 | Guyon et al. | 382/128 |
| 2012/0093390 | A1* | 4/2012 | Wiemker et al. | 382/134 |
| 2012/0163681 | A1* | 6/2012 | Lohse et al. | 382/128 |
| 2013/0094743 | A1* | 4/2013 | Coenegrachts | 382/131 |

OTHER PUBLICATIONS

Coenegracts, K. et al., "Focal liver lesion detection and characterization: Comparison of non-contrast enhanced and SPIO—enhanced diffusion-weighted single-shot spin echo echo planar and turbo spin echo T2-weighted imaging", European Journal of Radiology 72 (2009) 432-439.*

Celebi, M. et al, "Skin Lesion Segmentation Using Clustering Techniques", 2005, American Association for Artificial Intelligence, pp. 1-6.*

Hayes, C. et al. "Assessing changes in tumour vascular function using dynamic contrast-enhanced magnetic resonance imaging", 2002, NMR Biomed. 2002;15:154-163.*

Mulkern, R. et al., "Biexponential characterization of prostate tissue water diffusion decay curves over an extended b-factor range", 2006, Magnetic Resonance Imaging 24 (2006) 563-568.*

EPO ISR, Sep. 30, 2011.

EPO IPRP dated Jan. 22, 2013.

Belhassen Saoussen et al.: "A novel fuzzy C-means algorithm for unsupervised heterogenous tumor quantification in PET", Medical Physics, AIP, Melville, NY, US, vol. 37, No. 3, Feb. 25, 2010, pp. 1309-1324, XP012135651.

Moffat Bradford A et al.: "The functional diffusion map: an imaging biomarker for the early prediction of cancer treatment outcome.", Neoplasia (New York, N.Y.) Apr. 2006, LNKD-PUBMED:16756718, vol. 8, No. 4, Apr. 2006, pp. 259-267, XP002613378, ISSN: 1476-5586.

* cited by examiner

METHOD AND DEVICE FOR EVALUATING EVOLUTION OF TUMOURAL LESIONS

This application claims the benefit of European patent application No. 10007371.7, filed Jul. 16, 2010, which is hereby incorporated by reference in its entirety.

FIELD OF THE INVENTION

The present invention generally relates to a method and device for evaluating the evolution of tumour lesions through imaging systems, e.g. during oncology therapy like for instance radio-therapy or chemo-therapy. Through temporal imaging, plural 2D-digital images (pixel-based) or 3D-digital images (voxel-based) of the same tumour-affected organ may be acquired over a period in time, for instance a three month period during which the tumour is treated with a certain therapy. Advanced digital image acquisition systems such as scanners generating ultrasound (US) images, computed tomography (CT) images, magnetic resonance (MR) images, positron emission tomography (PET) images, positron emission tomography-computed tomography (PET-CT) images and single photon emission computed tomography (SPECT) images, allow detecting and visualizing tumour lesions. Through post-processing of the temporal images, changes in the tumour lesions may be visualized enabling the physician to determine if the tumour has evolved progressively, regressively or remained stable. The current invention in particular aims at increasing the accuracy and resolution of images used for follow up of therapy response, or more generally for follow-up of the evolution of tumour lesions over a period of time.

BACKGROUND OF THE INVENTION

Advancements in the digital image acquisition techniques such as ultrasound (US), computed tomography (CT), magnetic resonance (MR), positron emission tomography (PET), positron emission tomography-computed tomography (PET-CT) and single photon emission computed tomography (SPECT) that allow detecting and visualizing tumour lesions are still ongoing. The overall objective is to increase the accuracy of the images acquired. The main motivation therefore is that residual hot spots in malignant lesions can still remain undetected, possibly leaving one or more very aggressive tumoural cells in the patient, even in case of regressive therapy response. The detection of such hot spots through improved image acquisition and post-processing is important because patients with residual hot spots are not tumour-free as a result of which their prognosis has not improved meaningfully. The patient's prognosis improves meaningfully only if all tumoural cells are destroyed.

United States patent application US 2003/0211036, entitled "Method and Apparatus for Monitoring and Quantitatively Evaluating Tumour Perfusion" from the inventors Degani et al., describes the use of a non-toxic tracer based solution such as deuterated labelled water (HDO) to monitor and evaluate response to tumour therapy. The method described in US 2003/0211036 is based on quantifying tissue perfusion and uses non-invasive MRI based imaging to monitor the response to therapy. US 2003/0211036 recognizes the problem of heterogeneity of tumours and the need for increased accuracy of the images obtained. In order to overcome this problem, a perfusion based method that increases the spatial resolution is presented in US 2003/0211036. As is illustrated by FIG. 6 of US 2003/0211036, processed data retain the same resolution as acquired data. US 2003/0211036 consequently shows the advantage of using HDO over macromolecules as a tracer in perfusion based technique. It allows observing voxels in which flow is rate limiting as well as voxels in which contributions from capillary permeability affect the process of perfusion, thereby enhancing the accuracy.

US 2003/0211036 recognizes that a number of different perfusion related parameters such as the perfusion rate or the parameter K allow the determination of hot spots that are highly perfused. They also allow evaluation of the perfusion in voxels that are poorly perfused. Further, the significance of involvement of the intravascular volume fraction vp in perfusion based analysis is demonstrated in US 2003/0211036. At last, US 2003/0211036 also reveals the importance of processing the data at high resolution. Low resolution analysis averages the perfusion information resulting in loss of very high and very low values, thereby losing residual hot spots. The spatially degraded maps in US 2003/0211036 represent tumour slices with 1-2 voxels in the region of interest (ROI). Obtaining the mean values of high resolution data as well as the actual values of degraded resolution does not reflect the actual heterogeneity of the perfusion parameters. Therefore, US 2003/0211036 concludes the importance of monitoring and processing perfusion at high spatial resolution and using parametric maps or images that are colour coded for visual inspection of the spatial distribution.

The method known from US 2003/0211036 however suffers from several disadvantages that will be explained in the following paragraphs.

Firstly, US 2003/0211036 suggests the use of specific perfusion parameters that have been shown to be essential in solving the resolution based problems of the images. The effect of the diffusion of the tracer based solution is not addressed.

Secondly, the values for the voxels within the region of interest are averaged for the high resolution data and low resolution data. Such an approach results in loss of hot spots, and US 2003/0211036 fails to seek further improvements to this problem.

In summary, the method known from US 2003/0211036 recognizes but does not adequately solve the resolution problem. The possibility to accurately indicate and visualize quantitative changes in functional parameters such as true diffusion values and perfusion factor over a period of time is still missing. As a result, residual malignant tumour cells that are therapy-resistant are not detected and efficient prognosis of therapy response by the physician remains difficult or impossible.

The article "Assessing changes in tumour vascular function using dynamic contrast-enhanced magnetic resonance imaging" from the authors Carmel Hayes, Anwar R. Padhani and Martin O. Leach describes the use of dynamic contrast-enhanced DCE-MRI based quantitative and qualitative methods to evaluate the response to chemotherapy. Changes in the temporal pattern of signal enhancement, the rate and amplitude of enhancement and the volume transfer constant of contrast agent between the blood plasma and the extravascular extracellular space (EES), $K^{trans}$ and the EES fractional volume, $v_e$, were determined. Whole tumour region of interest analysed is compared with histogram based analysis in this article to investigate the impact of tumour heterogeneity. FIG. 6-FIG. 10 of the article of Hayes et al. compare the use of median values with pre- and post-treatment $K^{trans}$ values for whole tumour ROI analysis. The article shows that changes in $K^{trans}$ values for hot spots differ considerably from whole tumour averaged values.

The above mentioned article from C. Hayes et al. pertains to understand the characteristics of tumour microvasculature that play a role in the treatment of cancer. The article compares whole tumour region-of-interest analysis with histogram analysis and investigates the sensitivities of different methods. The article concludes that a higher median $K^{trans}$ value is more likely to respond to chemotherapy and that vascular permeability has a role to play in the delivery and efficacy of chemotherapeutic agents. By increasing the permeability of the tumours vasculature, selective drug delivery may be achieved. On the contrary, the chemotherapeutic agents give rise to reduction in $K^{trans}$ due to antivascular effect or due to tumour cell death. Although the article addresses the problem of whole tumour region-of-interest averaging, the article fails to teach a solution for improving the accuracy of evaluating tumour evolution through post-processing of temporal images.

In another article from the authors Bradford A. Moffat, Thomas L. Chenevert, Charles R. Meyer, Paul E. McKeever, Daniel E. Hall, Benjamin A. Hoff, Timothy D. Johnson, Alnawaz Rehemtulla and Brian D. Ross, entitled "The Functional Diffusion Map: An Imaging Biomarker for the Early Prediction of Cancer Treatment Outcome", an imaging technique for early prediction of brain tumour treatment efficacy is described. The technique quantifies the treatment induced changes in tumour water diffusion. The MRI-based approach described in this article spatially maps and quantifies treatment-induced changes in the tumour's water diffusion values resulting from alterations in cell density/cell membrane function and microenvironment. The article further introduces co-registration of images using a MIAMI Fuse based algorithm. Changes in apparent diffusion coefficient value (ADC) are visualized using colour codes such as red (increased ADC values above an upper threshold), blue (decreased ADC values below a lower threshold) or green (tumour voxels whose ADC values show changes in between the two thresholds) for early prediction of treatment efficacy. The residual hot spots are depicted in a voxel/pixel like manner. This is illustrated by FIG. 2 of the article.

The above article generally deals with the use of biomarkers that are sensitive to confirm drug activity and can be generalized to alternative functional parameters such as $K^{trans}$. Although automated, colour-coded voxel/pixel wise quantification of functional parameters allows follow-up of oncologic patients and enables evaluation of the presence respectively absence of response to therapy, the generated images are noisy and difficult to interpret by the physician.

In summary, existing methods for evaluating the evolution of tumoural lesions rely on averaged functional values, either perfusion or diffusion parameters, for the complete tumour region. Although these methods are quantitative, they may not show significant changes and definitely fail to quantify and visualize the heterogeneity of the tumour evolution, leaving for instance residual hot spots invisible for the physician. Alternative known techniques for the evaluation of tumour evolution are based on voxel/pixel wise calculation and coding of functional parameters. These techniques generally fail to provide quantitative output, and the produced images are difficult to interpret rapidly and accurately by physicians as a result of which they are of poor value for clinical practice.

It is an objective of the present invention to provide a method and device for evaluating the evolution of tumoural lesions that overcomes the above mentioned shortcomings of prior art solutions. In particular, it is an objective of the current invention to provide a usable method and tool for clinical applications that enables physicians to rapidly and accurately assess the response to therapy, drugs, etc., taking into account the heterogeneity of tumour evolution and minimizing the risk of leaving residual hot spots unnoticed.

SUMMARY OF THE INVENTION

The just mentioned objectives are realized and the above mentioned drawbacks of the prior art are resolved by a method for evaluating evolution of tumoural lesions, including the steps of:

providing a first image of the tumoural lesions, the first image being made at a first time instant;

providing a second image of the tumoural lesions, the second image being made at a second time instant that is later than the first time instant;

delineating a border of the tumourallesions in the first image and the second image; and registration of the tumourallesions in the first image and the second image, segmenting the tumoural lesions in the first image and the second image into concentric areas;

quantifying changes of at least one functional parameter between the concentric areas in the first image and respective corresponding concentric areas in the second image; and visualizing the changes in a two-dimensional or three-dimensional model of the tumoural lesions.

Thus, the invention essentially segments tumoural lesions in concentric areas, e.g. 3D concentric rings or 3D concentric shapes that follow the perimeter of the tumour lesions, and compares corresponding concentric areas over time using functional parameters. As an example, the current invention may for instance divide a tumoural lesion in ten concentric compartments, each covering 10% concentric area of the tumour lesion. The quantitative comparison of functional parameters between corresponding concentric areas over time is thereafter represented in a simple-to-interpret graphical format, i.e. a two-dimensional or three-dimensional model of the tumoural lesions wherein the concentric areas are visualized. This approach is advantageous because the concentric areas are expected to globally follow the expected patterns within tumour lesions. The invention consequently provides a more detailed, quantitative analysis of the pathology when compared with traditional techniques based on averaging over the entire tumour region of interest. This is realized without increasing the need for user interaction and without the need for very advanced and time consuming algorithms. Since the concentric areas are expected to follow typical tumour evolution, the method according to the invention shall be able to quantify and visualize heterogeneity in tumour evolution without leaving the physician with the difficulty of interpreting scattery images that are pixel/voxel wise encoded.

Concentric area analysis according to the invention allows to cope with changes in tumour volume during follow-up in a clinically useful and easy manner. The concentric area analysis allows to compare identical tumour areas during follow-up, e.g. analysis of the outer 10% of a tumoural lesion, even in cases where there is a change in tumour volume.

The concentric analysis that lies at the basis of the current invention also allows more detailed comparison of comparable tumour areas: tumour cell rich or aggressive areas often are located at the periphery of a lesion whereas tumour cell poor or necrotic areas often are located at the centre of a lesion.

The concentric area analysis according to the current invention further has the additional advantage that it can be automated in a reproducible manner. Automated/computarized analysis is important as it minimizes intra- and interobserver variability.

It is noticed that the term "concentric" in the context of the current patent application is used to indicate the parallel course of these concentric areas with—usually—irregular borders of the tumoural lesions. Tumoural lesions cannot be regarded as merely spherical lesions.

The irregular borders of the tumoural lesions are detected in the delineation phase of the method according to the invention. The automated/computerized delineation, for instance after the physician has manually placed a seed point in a part of the non-necrotic tumour area, may be executed for each tumoural lesion. This allows delineating the whole tumoural lesion within the organ or within a region of interest, including the eventually present necrotic areas in the centre of the tumours. For the delineation, several state-of-the-art algorithms can be used, depending for instance on the type of images (US, CT, MRI, PET, SPECT, . . . ).

In addition to concentric area analysis, the present invention relies on delineation and registration of tumoural lesions instead of registration of the organ under investigation. This way, organ distortions occurring from one breathing cycle to another are avoided.

Technologically, the registration software or hardware should allow a comparison between any two sets of functional images for follow-up and evaluation during treatment. For ease of use however, no other registration than the registration allowing comparison of identical tumoural lesions is strictly needed. After this registration, software can optionally automatically link quantitative concentric data, colour-coded data and histogram data to each lesion, as will be described in more detail below.

Optionally, quantifying changes of at least one functional parameter may include voxel-by-voxel hot spot analysis.

Thus, the invention may further enhance the resolution of the concentrically segmented images through post-processing tools that can indicate hot spots with significant changes in functional parameters such as true diffusion values and perfusion values ($K^{trans}$) in a pixel/voxel based manner. Hot spot analysis allows accurate detection of residual active tumoural areas. The hot spot analysis is preferably executed in the peripheral concentric areas, e.g. the outer 3D ring, and may result in displaying the 10% worst values for the functional parameter there. This way, hot spot analysis will allow to detect and select the most aggressive tumoural areas within each lesion.

The concentric area analysis indeed allows quantification of functional values of the outer 10% of each tumoural lesion, automatically giving quantitative figures for each peripheral concentric area of each tumoural lesion. Redundancy of numbers, which is not useful in clinical practice, is avoided.

Additional analysis using hot spot display may however be contemplated and remains important since aggressive, therapy-resistant tumoural areas are not necessarily always located in the periphery of a tumoural lesion.

Hot spot analysis allows an easy and accurate detection of residual active tumoural areas. Visual hot spot displays further are an easy means for semi-quantitative evaluation by the professional, i.e. the clinician, radiologist, or researcher.

The hot spot analysis, either semi-quantitatively or purely quantitative, further contributes to avoid averaging over the entire tumour region which is the main drawback observed in existing methods that use Region-of-Interest (ROI) and Volume-of-Interest (VOI) evaluation. The values of tumour cell rich and tumour cell poor or necrotic areas are no longer averaged thereby reducing the risk of missing residual active tumour areas. The method according to the invention preferably automatically quantifies functional values such as true diffusion value, perfusion fraction, $K^{trans}$ of the peripheral tumoural area for hot spot detection, thereby avoiding redundancy of numbers. The hot spot analysis further minimizes intra- and inter-observer variability.

Further optionally, quantifying changes of at least one functional parameter may include histogram analysis.

Thus, in order to better quantify and visualize the changes in functional parameters within the concentric areas, histogram analysis and quantitative number display may supplementary be included in the method according to the invention. The histogram analysis and quantitative number display may be limited to certain concentric areas, for instance the 10% peripheral area. For each functional parameter, the pre- and post-treatment histogram and additional quantitative numbers may be shown. This provides the physician an even more accurate view on the response to tumour treatment, or the evolution of tumour lesions in general.

Further optionally, visualizing the changes may include colouring two-dimensional or three-dimensional concentric shapes in the two-dimensional or three-dimensional model using colours depending on the changes of the at least one functional parameter.

Colour-coded display of the changes shall further simplify interpretation by the physician and minimize inter- or intraobserver variablity. The colour coding may be applied to the entire lesion or may be restricted to for instance the peripheral 10% concentric area of each tumoural lesion.

The colouring improves and simplifies the comparison during treatment, even if the tumoural volume changes, but also reduces the problem of finding the corresponding voxels in case of rotations of the lesions, for instance due to organ changes because of the treatment regimens.

The method may optionally include 3-scale colour coding with:

a first colour for changes of the at least one functional parameter indicative for regressive tumour lesions or regressive tumour area within one lesion;

a second colour for changes of the at least one functional parameter indicative for stable tumour lesions or stable tumour area within one lesion; and a third colour for changes of the at least one functional parameter indicative for progressive tumour lesions or progressive tumour area within one lesion.

The optional 3-scale colour-coding may be performed as follows. All voxels within a concentric area are compared with the mean value and the standard deviation for this concentric area. All voxels with a value worse than the mean value plus standard deviation are for instance coloured red, indicating progressive disease. All voxels with a value equal to the mean value plus or minus the standard deviation are for instance coloured green, indicating stable disease. All voxels with a value better than the mean value plus standard deviation are for instance coloured blue, indicating regressive disease.

It is noticed that—as an alternative or additionally—one particular colour could be used for the 10% worst voxels for all tumoural lesions considered as a whole within one organ. This would allow a selection of the most aggressive areas or most therapy-resistant lesions within the organ. The most aggressive tumoural lesions are expected to release more aggressive hormones and other substances enabling a more promoted growth of tumours and metastases.

According to a further optional aspect, the method for evaluating evolution of tumoural lesion according to the current invention may include the step of:

determining a first percentage of regressive tumour lesions, a second percentage of stable tumour lesions, and a third percentage of progressive tumour lesions.

One example of additional information that may be displayed by the current invention hence is the percentage of regressive disease (RD), the percentage of stable disease (SD) and the percentage of progressive disease (PD).

Optionally, delineating the border of the tumoural lesions may be done using the Single-Shot Spin Echo Echo Planar Imaging or SS SE-EPI algorithm, with a b-parameter value that is 50 s/mm$^2$ or lower.

Indeed, in case of MR imaging, segmentation is preferably based on the SS SE-EPI algorithm, using a low b-value. The low b-value enables, amongst other advantages, the use of an optimized low echo time allowing an adequate signal-to-noise ratio (SNR) and contrast-to-noise ratio with the surrounding organ in combination with a high spatial resolution for this sequence.

The invention also associates with a machine that can read and store data based on an algorithm that can calculate the functional parameters separately for the assigned segmented lesions within the delineated tumour lesions. This is based on changing a single parameter such as the b-parameter of this algorithm that a refinement in the output resolution is achieved.

Advantageously, as is specified by claim 8, the b-parameter value is equal to 10 s/mm$^2$.

A parameter value of b=10 s/mm$^2$ enables to delineate all tumoural lesions in images having high spatial resolution with adequate contrast-to-noise ratio.

The first image and second image may be one of the following:
- ultrasound or US images;
- computed tomography or CT images;
- magnetic resonance or MR images;
- positron emission tomography or PET images;
- positron emission tomography computed tomography or PET-CT images; or
- single photon emission computed tomography or SPECT images.

For imaging different from MRI, the skilled person will be able to select an appropriate delineation algorithm enabling high resolution imaging with an adequate contrast-to-noise ratio.

The at least one functional parameter may include one or more of the following:
- a diffusion parameter;
- a perfusion parameter;
- a volume transfer coefficient $K^{TRANS}$; and
- a metabolic parameter.

Examples of such diffusion parameters are the (true) diffusion value D, the apparent diffusion coefficient ADC based on different combinations of b-parameter values, etc. Examples of perfusion parameters are the perfusion fraction f, the in-flow rate, the out-flow rate/contrast elimination, etc. An example of a metabolic parameter is the metabolic radio activity SUV for PET scans.

It is noticed that the volume transfer coefficient $K^{trans}$ is to be preferred over the rate constant Kep since $K^{trans}$ is independent of edema. Since the Extravascullar Extracellular Space (EES=ve) can vary with tumoural edema induced by the therapy, $K^{trans}$ provides a physiologically more relevant measure for the state of the capillary permeability than Kep (=$k^{trans}$/ve).

It is noticed that the combined use of different functional parameters can add to the sensitivity and specificity of the evaluation of residual hot spots.

Optionally, the method for visualizing evolution of tumoural lesions according to the invention may include one or more of the following steps:
- therapy response assessment;
- evaluation of a therapeutic method;
- evaluation of a drug;
- evaluation of tumoural pathology;
- hot spot identification in the tumoural lesions.

Indeed, the current invention can be used in clinical practice and for the evaluation of drug development or pharmaceutical trials like the testing of new drugs and accurate dose levels in humans and in animal models. Also, all types of anti-tumoural therapies can be evaluated, e.g. chemotherapy, radiotherapy, anti-angiogenetic or other medication, ablation-techniques based on heating, extreme cold-application or alcoholization, etc.

The invention is of use for accurate evaluation of oncologic pathologies of any kind.

The invention further is useful for early, reproducible and accurate evaluation of the progression, regression or stability of disease for each individual patient, i.e. patient-tailored evaluation. Such early evaluation allows an accurate use of expensive anti-tumoural therapies and allows and early switch-over to other, more efficient anti-tumoural therapy.

The invention will also enable improvement of patient prognosis, a decrease of side-effects, shorter hospital stay and earlier return to the work environment. Merely morphologic criteria like for instance RECIST criteria, WHO criteria, volumetric criteria, etc., are inappropriate for the accurate monitoring of a therapy in oncologic patients. In many cases of regressive and progressive disease, the volume or diameter of tumoural lesions only changes late during treatment, definitely much later than functional parameters and laboratory values change. Further, e.g. in case of good response to therapy, volumes of tumoural lesions can even increase initially due do the cytotoxic edema. Also, anti-angiogenetic agents may not alter the volume of tumoural lesions in cases of complete response.

Further, the invention may be applicable to a broader range of applications such as for instance the identification of particular hot spots in tumoural lesions.

In addition to a method for evaluating evolution of tumoural lesions, the current invention concerns a corresponding device including:
- means for receiving a first image of the tumoural lesions, the first image being made at a first time instant;
- means for receiving a second image of the tumoural lesions, the second image being made at a second time instant later than the first time instant;
- means for delineating a border of the tumoural lesions in the first image and the second image;
- means for registration of the tumoural lesions in the first image and the second image;
- means for segmenting the tumoural lesions in said the image and the second image into concentric areas;
- means for quantifying changes of at least one functional parameter between the concentric areas in the first image and respective corresponding concentric areas in the second image; and
- means for visualizing the changes in a two-dimensional or three-dimensional model of the tumoural lesions.

The images that are captured over a period of time may be stored for example in a computer memory. The means for receiving the images hence may read the images from memory, may receive the images directly from cameras or scanning equipment or may receive the images from a wired or wireless network over which the images are transferred, e.g. a LAN, WAN or the Internet. The means for delineating, registration, segmenting and quantifying changes may be implemented in software programs running on a computer, or more generally a processor with program and data memory. The means for visualizing may be a display or screen with corresponding control software and hardware.

BRIEF DESCRIPTION OF THE DRAWINGS

FIG. 3 illustrates the automated, voxel-based selection and displaying of concentric tumoural areas in an embodiment of the method according to the present invention, more precisely:

FIG. 4 illustrates 3-colour-coded display of changes in tumoural lesions as visualized in an embodiment of the method according to the present invention, more particularly:

DETAILED DESCRIPTION OF EMBODIMENT(S)

Figure 1:
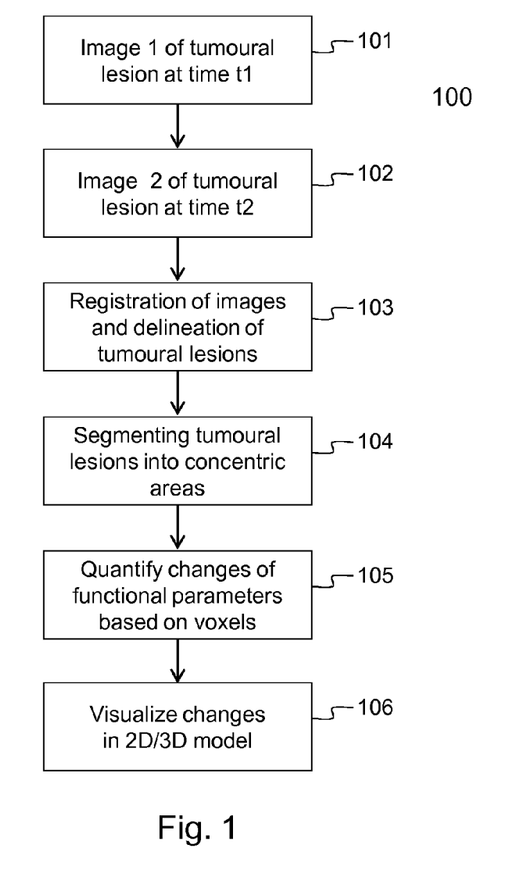
FIG. 1 is a flow chart representing an embodiment of the method for evaluating evolution of tumoural lesions according to the present invention.
Figure 2:
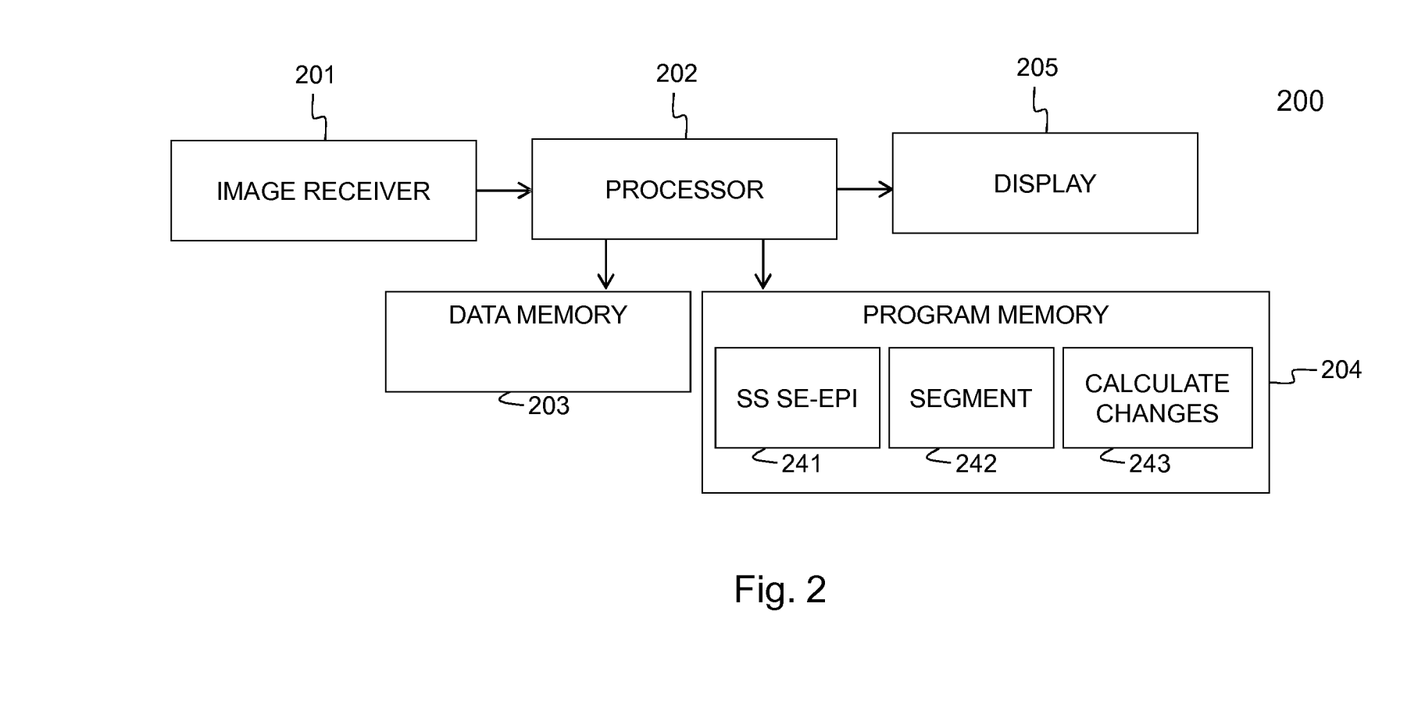
FIG. 2 is a functional block scheme of an embodiment of the device for evaluating evolution of tumoural lesions according to the present invention.

Embodiments of the method 100 and device 200 for evaluating the evolution of tumour lesions over a period of time t1-t2 are illustrated respectively by FIG. 1 and FIG. 2. In step 101, a first image taken at time t1 is received via the interface 201, e.g. a network connection or connection to an MRI scanner. Similarly, in step 102, a second image taken at time t2, is received via the interface 201. The images are temporarily stored in data memory 203 for being processed by processor 202. In the images, the tumour lesions are delineated using the SS SE-EPI algorithm. The delineation followed by registration of the images, i.e. step 103 in FIG. 1, is executed by the processor 202 that is software controlled. The SS SE-EPI algorithm 241 may be one out of several delineation algorithms that is available in the program memory 204 of the device 200 according to the invention. The delineation of tumour lesions may be fully automated, i.e. the algorithm also detects the tumour lesions in the images, or may be semi-automated, i.e. the physician selects the lesions in the images that will be delineated for instance by clicking with a mouse pointer on a lesion in the displayed image. In the next step, 104, selected tumoural lesions are segmented into concentric areas. The processor 202 thereto applies a segmentation algorithm 242 that segments a tumoural lesion for instance in ten concentric areas each occupying 10% of the total lesion volume (3D) or surface (2D). Via pixel- or voxel-based mapping of the images, changes in one or more functional parameters over time, can be calculated in step 105 by the processor 202 under instruction of software module 243. The quantified changes in functional parameters may be displayed as histograms, like the ones shown in FIG. 3B, and the tumour lesions may be visualized as three colour coded models, like the ones drawn in FIG. 3C. In the example of FIG. 3C the peripheral colour 301 indicates aggressive/active tumour cells of the lesion, the central colour 302 represents inactive/necrotic cells, and the middle colour 303 represents stable cells.

Figure 3A:
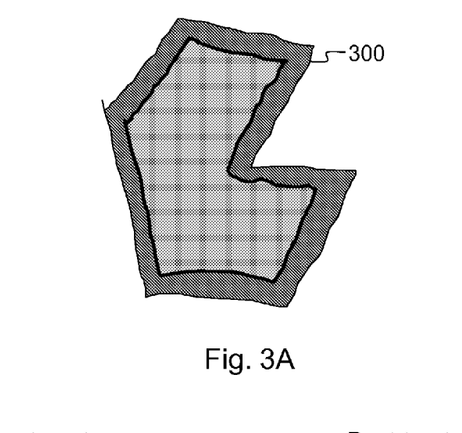
FIG. 3A illustrates peripheral progressive lesion of the disease.

FIG. 3A illustrates display of a tumoural lesion after automated voxel-based selection and segmentation into 10 concentric areas according to the present invention. Each concentric area comprises 10% of the tumoural lesion. For each concentric area and for each functional parameter that is quantified, there may be automated display of one or more numbers, a histogram, and a 3-colour coded model of the tumour lesion for the latest out of the temporal imaging sets. In FIG. 3A, the inner concentric areas represent stable disease and are therefore coloured green on the display or regular grey in FIG. 3A. The peripheral concentric area 300 is coloured red on the display and dark grey in FIG. 3A because the quantified functional parameters are assumed to show progressive disease there.

Figure 3B:
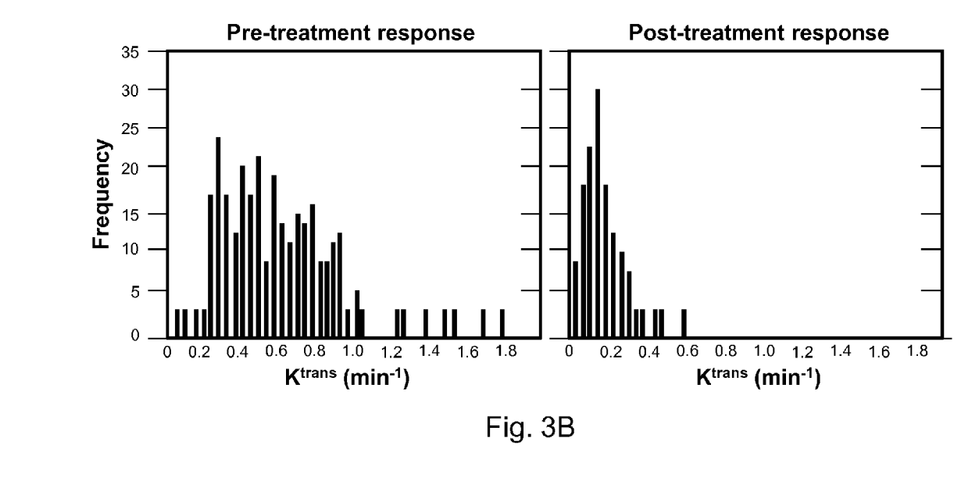
FIG. 3B illustrates histogram based quantitative evaluation.
Figure 3C:
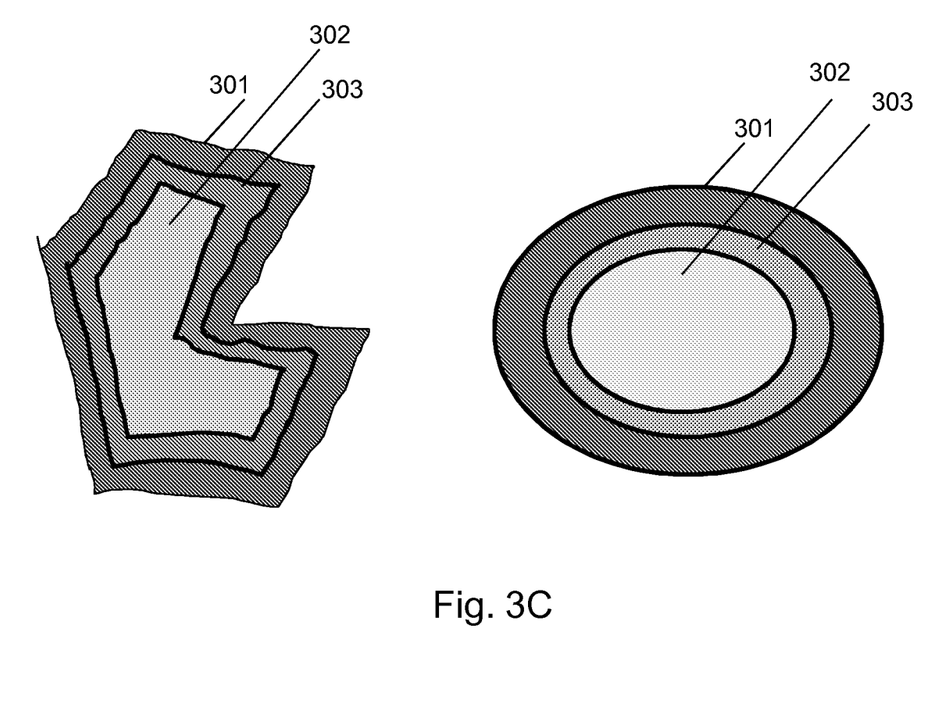
FIG. 3C illustrates 3-colour-coded imaging based on semi-quantitative evaluation of the lesions.

FIG. 3B illustrates the pre-treatment and post-treatment histograms for the tumoural lesion whose model is represented in FIG. 3A.

FIG. 3C shows two other examples of tumoural lesions with regressive evolution of the disease in the central concentric areas 302, coloured light grey in FIG. 3C or blue on the display, stable disease in the regular grey shaded concentric areas 303, coloured green on the display, and progressive evolution of the disease in the outer concentric area 301 of the lesion, coloured red on the display.

Figure 4A:
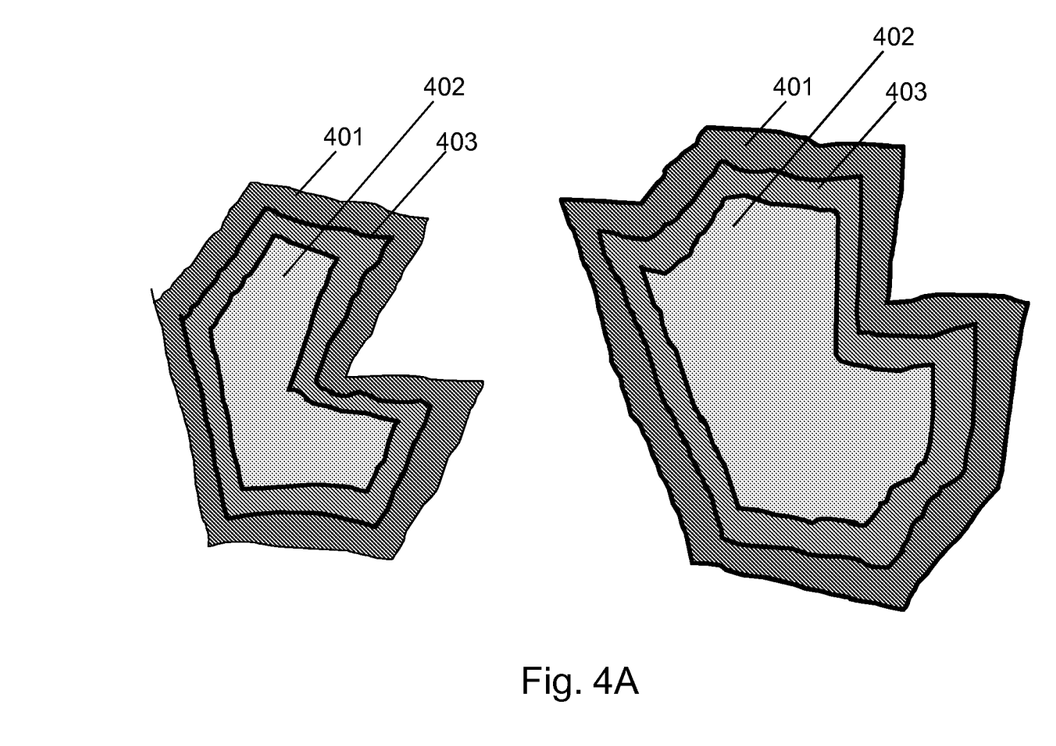
FIG. 4A depicts changes in tumour volume and changes in tumour border irregularity or changes in necrotic area.

FIG. 4A illustrates coping with a change in tumour volume and a change in tumoural border irregularity. Change in necrotic area is also possible. The tumoural lesion is again visualized by 3-colour-coded display of the change of one or more functional parameters for the different concentric areas. The 3-scale colour-coding is performed as follows. All voxels within a concentric area are compared with the mean value plus or minus the standard deviation for this concentric area. Thereafter, all voxels with a value worse than the mean value plus or minus the standard deviation are coloured red, with value equal to the mean value plus or minus the standard deviation are coloured green and with a value better than the mean value plus or minus the standard deviation are coloured blue. In FIG. 4A, this has resulted in the central concentric areas 402 being coloured blue, the concentric areas 403 being coloured green, and the peripheral 10% concentric area 401 being coloured red.

Figure 4B:
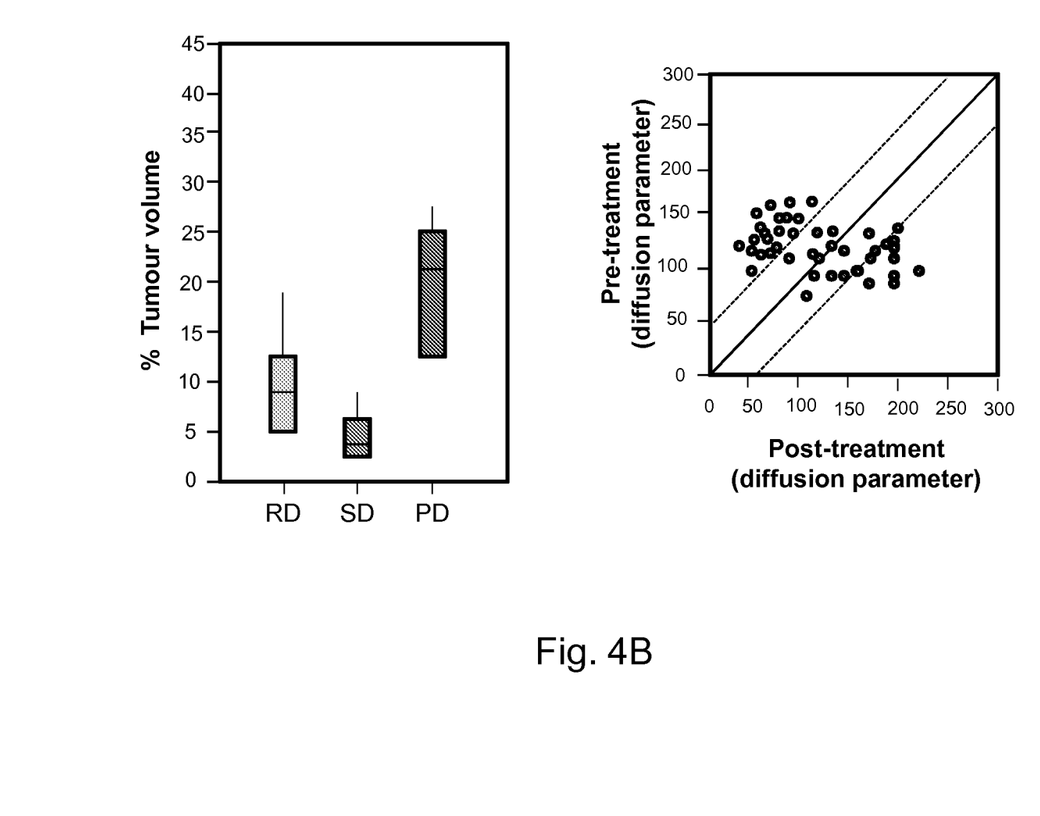
FIG. 4B shows a diagram quantifying the percentage of Stable Disease (SD), Regressive Disease (RD) and Progressive Disease (PD) in the peripheral 10% concentric area of each tumoural lesion.

FIG. 4B further shows in the leftmost picture the percentage of tumoural volume that was found to represent stable disease (SD), regressive disease (RD) and progressive disease (PD). This information may be displayed together with the colour-coded 2D or 3D model of the tumoural lesion.

The rightmost picture of FIG. 4B illustrates an alternative method for colour coding. For each voxel, this method verifies if the post-treatment diffusion has changed in comparison with the pre-treatment diffusion for the corresponding voxel. In case of an increase in diffusion that is larger than a certain threshold (represented by the lower dashed line), the voxel is assumed to represent progressive disease and will be coloured accordingly. In case of an decrease in diffusion that is again larger than a certain threshold (represented by the upper dashed line), the voxel represents regressive disease and will be coloured accordingly. In between the two thresholds, the voxels are assumed to represent stable disease.

Figure 5:
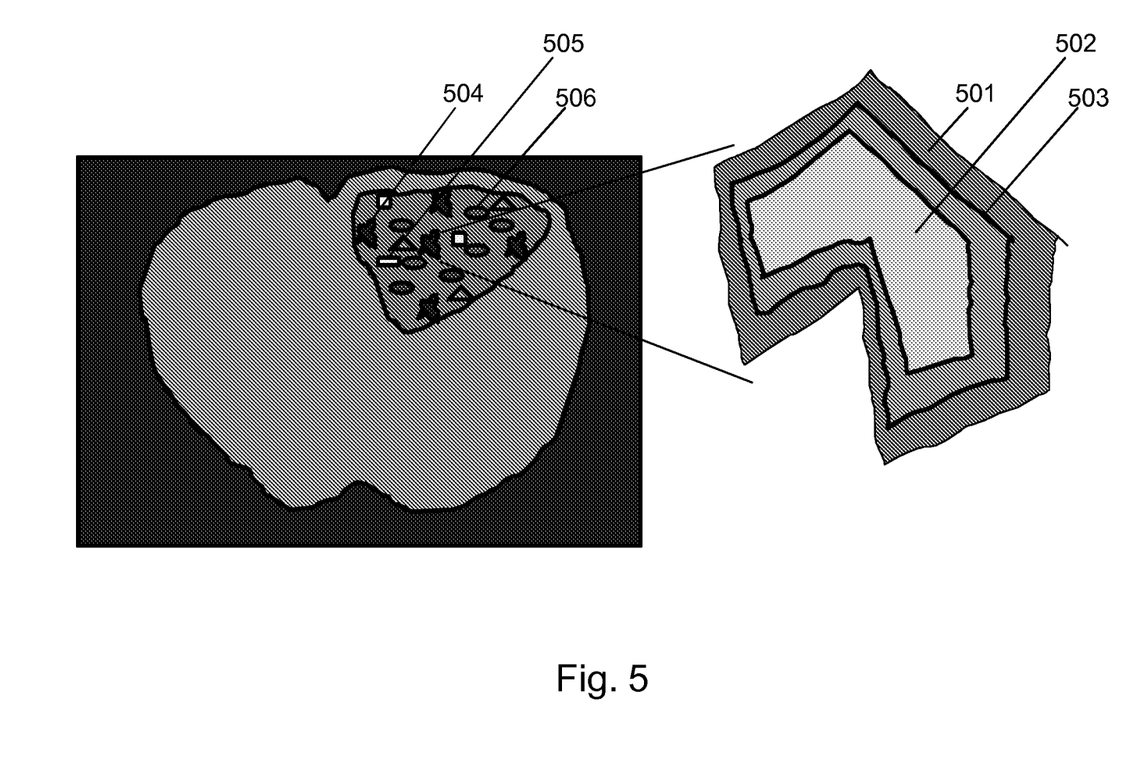
FIG. 5 illustrates display of an affected organ in an embodiment of the present invention with magnification of an aggressive tumoural lesion.

According to another embodiment of the invention, illustrated by FIG. 5, it is possible to select a region of interest within the tumour affected organ and highlight the aggressive tumoural lesions, coloured black in FIG. 5. Such an aggressive tumoural lesion 504 may be further magnified, as is shown on the rightmost part of FIG. 5. Magnification and displaying the concentric areas of an aggressive tumoural lesion 504 may show concentric areas 501 with progressive tumour activity, concentric areas 502 with regressive or necrotic tumour activity even in an aggressive lesion 504, and concentric areas 503 with stable tumour activity. The magnification is achieved through voxel-based mapping of the lesion under study according to the current invention. FIG. 5 further shows a number of lesions with stable tumoural activity like for instance 506, coloured grey in FIG. 5 and green on the display. In addition, the selected region of interest in FIG. 5 contains a number of lesions with regressive tumoural activity, like for instance 505, coloured white in FIG. 5 and blue on the display.

Figure 6:
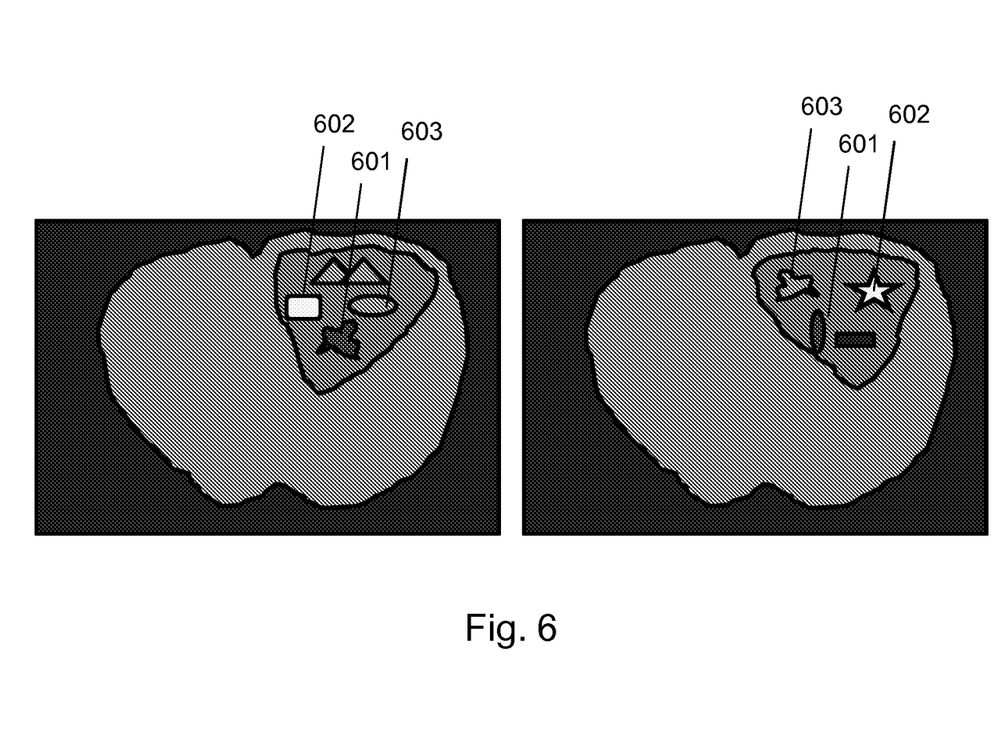
FIG. 6 illustrates display of two images of the same tumour-affected organ in an embodiment of the current invention, more particularly a 3-scale colour-coded image showing changes in the 10% worst hot spots for all tumoural lesions within this one organ.

Another advantage of the current invention is that it allows comparing the images produced for an organ over time, like the leftmost picture and rightmost image shown in FIG. 6. Changes in volume of certain tumoural lesions, e.g. 601, 602 and 603, can be visualized, and the overall amount of lesions within a selected region of interest can be monitored as well.

FIG. 6 illustrates automated detection of the 10% worst voxels considering all tumoural lesions within one organ, or within a selected region of interest. For each functional parameter, the 10% reference value is calculated automatically. After the treatment, a second temporal image, shown in the rightmost part of FIG. 6, is compared with the earlier image. Again, the 10% worst voxels regarding all lesions in the organ or the selected region of interest are detected automatically. These 10% worst voxels are compared with the 10% reference value of the earlier temporal image. As a result of the comparison, the changes during treatment are quantified. These changes are displayed using a 3-scale colour-coding for all tumoural lesions within the organ, even if volumes of lesions and/or number of lesions have changed.

Figure 7:
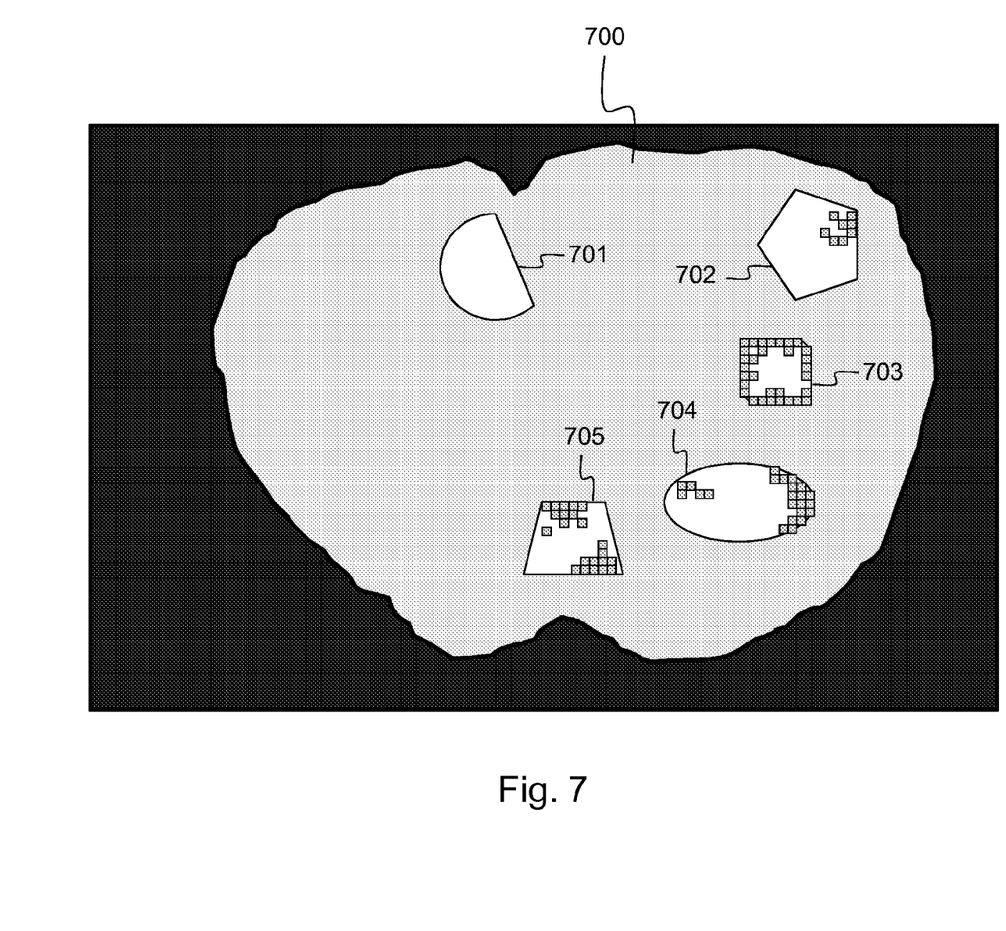
FIG. 7 illustrates display of a tumour-affected organ in an embodiment of the invention that displays the 10% worst voxels for all tumoural lesions.

FIG. 7 shows the display of an organ 700 containing a number of tumoural lesions, 701, 702, 703, 704 and 705, in yet another embodiment of the current invention. One visual colour (e.g. red on the display or grey in FIG. 7) shows the 10% worst voxels of all tumoural lesions within this one organ. One lesion, i.e. lesion 701, does not contain voxels that form part of the 10% worst voxels when considering all tumoural lesions in one organ. The professional in other words gets the possibility to colour-code the 10% worst voxels for all tumoural lesions in the organ as a whole.

Different embodiments of the invention are able to obtain images from a wide range of image acquisition systems such as CT, US, MR, PET, PET-CT, SPECT scanners and enables evaluation of therapy response, therapeutic methods, drug effectiveness, tumoural pathology, and hot spot identification.

The different embodiments of the present invention evaluates the evolution of tumoural lesions based on values of perfusion and diffusion parameters and metabolic parameters, generally known as functional parameters that show change in response to therapy from a first image to a second image for comparison.

It is further noticed that detection of residual, resistant tumoural hot spots, and visual display thereof in accordance with the current invention, allows to apply more local therapies such as ablation, surgery, local drug activation, local radiotherapy, etc.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method for evaluating evolution of tumoural lesions, said method comprising the steps of:
   providing a first image of said tumoural lesions, said first image being made at a first time instant;
   providing a second image of said tumoural lesions, said second image being made at a second time instant that is later than said first time instant;
   delineating a border of said tumoural lesions in said first image and said second image;
   registration of said tumoural lesions in said first image and said second image;
   segmenting said tumoural lesions in said first image and said second image into concentric areas;
   quantifying changes of at least one functional parameter between said concentric areas in said first image and respective corresponding concentric areas in said second image;
   visualizing said changes in a two-dimensional or three-dimensional model of said tumoural lesions, said visualizing comprising colouring two-dimensional or three-dimensional concentric shapes in said two-dimensional or three-dimensional model using colours depending on said changes of said at least one functional parameter, wherein said colours comprise:
- a first colour for changes of said at least one functional parameter indicative for regressive tumour lesions or regressive tumour area within one lesion;
- a second colour for changes of said at least one functional parameter indicative for stable tumour lesions or stable tumour area within one lesion; and
- a third colour for changes of said at least one functional parameter indicative for progressive tumour lesions or progressive tumour area within one lesion; and determining a first percentage of regressive tumour lesions, a second percentage of stable tumour lesions, and a third percentage of progressive tumour lesions.

2. A method for evaluating evolution of tumoural lesions according to claim 1, wherein quantifying changes of at least one functional parameter comprises voxel-by-voxel hot spot analysis.

3. A method for evaluating evolution of tumoural lesions according to claim 1, wherein quantifying changes of at least one functional parameter comprises histogram analysis.

4. A method for evaluating evolution of tumoural lesions according to claim 1, wherein delineating said border of said tumoural lesion is done using the Single-Shot Spin Echo Echo Planar Imaging or SS SE-EPI algorithm, with a b-parameter value that is 50 s/mm2 or lower.

5. A method for evaluating evolution of tumoural lesions according to claim 4, wherein said b-parameter value is equal to 10 s/mm$^2$.

6. A method for evaluating evolution of tumoural lesions according to claim 1, wherein said first image and said second image are one of the following:
- ultrasound images;
- computed tomography images;
- magnetic resonance images;
- positron emission tomography images;
- positron emission tomography-computed tomography images; or
- single photon emission computed tomography images.

7. A method for visualizing evolution of tumoural lesions according to claim 1, wherein said at least one functional parameter comprises one or more of the following:
- a diffusion parameter;
- a perfusion parameter;
- a volume transfer coefficient Ktrans; and
- a metabolic parameter.

8. A method for visualizing evolution of tumoural lesions according to claim 1, further comprising one or more of the following steps:
- therapy response assessment;
- evaluation of a therapeutic method;
- evaluation of a drug;
- evaluation of tumoural pathology;
- hot spot identification in said tumoural lesions.

9. A device for evaluating evolution of tumoural lesions, said device comprising:
- means for receiving a first image of said tumoural lesions, said first image being made at a first time instant;
- means for receiving a second image of said tumoural lesions, said second image being made at a second time instant later than said first time instant;
- means for delineating a border of said tumoural lesions in said first image and said second image;
- means for registration of said tumoural lesions in said first image and said second image;
- means for segmenting said tumoural lesions in said first image and said second image into concentric areas;
- means for quantifying changes of at least one functional parameter between said concentric areas in said first image and respective corresponding concentric areas in said second image;
- means for visualizing said changes in a two-dimensional or three-dimensional model of said tumoural lesions, said means for visualizing comprising means for colouring two-dimensional or three-dimensional concentric shapes in said two-dimensional or three-dimensional model using colours depending on said changes of said at least one functional parameter, wherein said colours comprise:
  - a first colour for changes of said at least one functional parameter indicative for regressive tumour lesions or regressive tumour area within one lesion;
  - a second colour for changes of said at least one functional parameter indicative for stable tumour lesions or stable tumour area within one lesion; and
  - a third colour for changes of said at least one functional parameter indicative for progressive tumour lesions or progressive tumour area within one lesion; and
- means for determining a first percentage of regressive tumour lesions, a second percentage of stable tumour lesions, and a third percentage of progressive tumour lesions.

* * * * *